(12) United States Patent
Tohma et al.

(10) Patent No.: US 7,959,833 B2
(45) Date of Patent: Jun. 14, 2011

(54) THERMOELECTRIC CONVERSION MATERIAL, METHOD FOR PRODUCING THE SAME AND THERMOELECTRIC CONVERSION DEVICE

(75) Inventors: Tetsuro Tohma, Tsukuba (JP); Kazuo Sadaoka, Tsukuba (JP); Yoshio Uchida, Tsukuba (JP)

(73) Assignee: Sumitomo Chemical Co., Ltd., Tokyo (JP)

( * ) Notice: Subject to any disclaimer, the term of this patent is extended or adjusted under 35 U.S.C. 154(b) by 552 days.

(21) Appl. No.: 11/910,982

(22) PCT Filed: Apr. 11, 2006

(86) PCT No.: PCT/JP2006/308006
§ 371 (c)(1),
(2), (4) Date: Oct. 9, 2007

(87) PCT Pub. No.: WO2006/109884
PCT Pub. Date: Oct. 19, 2006

(65) Prior Publication Data
US 2010/0140567 A1 Jun. 10, 2010

(30) Foreign Application Priority Data
Apr. 13, 2005 (JP) ................... 2005-115406

(51) Int. Cl.
*H01B 1/08* (2006.01)
*H01L 35/22* (2006.01)

(52) U.S. Cl. .................. 252/518.1; 136/236.1

(58) Field of Classification Search .............. 252/518.1, 252/521.1, 521.2; 136/236.1, 241
See application file for complete search history.

(56) References Cited

U.S. PATENT DOCUMENTS

| 6,514,320 | B1 * | 2/2003 | Matacotta et al. | ............. | 95/129 |
| 6,855,664 | B2 * | 2/2005 | Matacotta et al. | ............. | 502/340 |
| 7,700,006 | B2 * | 4/2010 | Blumberg et al. | ............. | 252/500 |

FOREIGN PATENT DOCUMENTS

| JP | 08-186293 A | 7/1996 |
| JP | 9-321346 A | 12/1997 |
| JP | 2000-211971 A | 8/2000 |
| JP | 2004-356476 A | 12/2004 |

OTHER PUBLICATIONS

English translation of JP2000-211971 (cited on IDS).*
Nemoto et al "Ferroquadrupole ordering and T5 rattling motion in clathrae compound Ce3Pd20Ge" arXiv:cond-mat/0310552v1 (Oct. 23, 2003).*
Tayama et al "Thermoelectric property of ladder-type oxide" Trans Mater Res Soc Jpn, 29(6) (Abstract Only) 2004.*

(Continued)

*Primary Examiner* — Mark Kopec
(74) *Attorney, Agent, or Firm* — Sughrue Mion, PLLC

(57) ABSTRACT

A thermoelectric conversion material contains a metal oxide comprising $M^1$, $M^2$ and oxygen, wherein $M^1$ is at least one selected from the group consisting of Ca, Sr and Ba and may contain an element selected from the group consisting of Li, Na, K, Mg, La, Ce, Nd, Sm, Bi and Pb, and wherein $M^2$ comprises Cu as an essential element and may contain an element selected from the group consisting of Ti, V, Cr, Mn, Fe, Co and Ni. The mole ratio of $M^2$ to $M^1$ ($M^2/M^1$) is 1.2 to 2.2.

4 Claims, 4 Drawing Sheets

OTHER PUBLICATIONS

K. Isawa; Delafossite-type copper oxides and their derived phases: A review of structure and physical properties; Research Signpost; 37/661 (2), Kerala, India.

Von Katsuo Kato et al.; Die Struktur des Erdalkalimetall-Oxocuprats, $M_{10} CU_{17} O_{29}$; Acta Cryst. (1988), C44, 1881-1884, English-language Abstract.

First Office Action issued by State Intellectual Property Office, P.R. China for Chinese Patent Application No. 200680011563.4 dated Dec. 12, 2008.

Second Office Action issued by State Intellectual Property Office, P.R. China for Chinese Patent application No. 200680011563.4 dated Jun. 5, 2009.

Third Office Action issued by State Intellectual Property Office, P.R. China for Chinese Patent Application No. 200680011563.4 dated Feb. 12, 2010.

Decision on Rejection issued by State Intellectual Property Office, P.R. China for Chinese Patent Application No. 200680011563.4 dated Sep. 16, 2010.

* cited by examiner

THERMOELECTRIC CONVERSION MATERIAL, METHOD FOR PRODUCING THE SAME AND THERMOELECTRIC CONVERSION DEVICE

TECHNICAL FIELD

The present invention relates to a thermoelectric conversion material, a method for producing the material and a thermoelectric conversion device. More particularly, the present invention relates to an oxide thermoelectric conversion material, a method for producing the material and a thermoelectric conversion device containing the material.

BACKGROUND ART

Thermoelectric conversion power generation is power generation for converting thermal energy into electric energy using a thermoelectromotive force (Seebeck effect) generated by giving a temperature difference in a thermoelectric conversion device.

The thermoelectric conversion device contains a p-type thermoelectric conversion material and an n-type thermoelectric conversion material, and the energy conversion efficiency of the thermoelectric conversion device depends on the figures of merit (Z) of the thermoelectric conversion materials. The figure of merit (Z) of each thermoelectric conversion material is calculated from the following formula (1) using the Seebeck coefficient ($\alpha$), the electric conductivity ($\sigma$) and the thermal conductivity ($\kappa$) of the material; the larger the figures of merit (Z) of the thermoelectric conversion materials contained in the thermoelectric conversion device, the higher the energy conversion efficiency of the thermoelectric conversion device.

$$Z = \alpha^2 \times \sigma / \kappa \quad (1)$$

In addition, as oxide thermoelectric conversion materials, a compound represented by the formula $ACuO_{2+\delta}$ (A=Y, alkaline earth metal and rare earth metal) is known. See Oxide Thermoelectrics, 2002 (ISBN 81-7736-100-7), p. 213 to 234.

The figures of merit (Z) of the compound described in the reference are low, $10^{-12}$ to $10^{-10} K^{-1}$, and a thermoelectric conversion material with a high figure of merit (Z) is required.

DISCLOSURE OF THE INVENTION

An object of the present invention is to provide a thermoelectric conversion material with a high figure of merit (Z), a method for producing the material and a thermoelectric conversion device.

To solve the problem, the present inventors conducted earnest research on thermoelectric conversion materials and accomplished the present invention.

The present invention provides a thermoelectric conversion material comprising a metal oxide containing $M^1$, $M^2$ and oxygen, wherein $M^1$ is at least one selected from the group consisting of Ca, Sr and Ba and may contain one selected from the group consisting of Li, Na, K, Mg, La, Ce, Nd, Sm, Bi and Pb, $M^2$ contains essentially Cu and may contain one selected from the group consisting of Ti, V, Cr, Mn, Fe, Co and Ni, and the mole ratio of $M^2$ to $M^1$ ($M^2/M^1$) is from 1.2 to 2.2.

The present invention provides a method for producing a thermoelectric conversion material comprising the step of sintering a mixture of metal compounds containing $M^1$ and $M^2$ at from 600 to 1000° C.

wherein $M^1$ is at least one selected from the group consisting of Ca, Sr and Ba and may contain one selected from the group consisting of Li, Na, K, Mg, La, Ce, Nd, Sm, Bi and Pb, $M^2$ contains essentially Cu and may contain one selected from the group consisting of Ti, V, Cr, Mn, Fe, Co and Ni, and the mole ratio of $M^2$ to $M^1$ ($M^2/M^1$) is from 1.2 to 2.2.

Furthermore, the present invention provides a thermoelectric conversion device comprising the above thermoelectric conversion material.

MODES FOR CARRYING OUT THE INVENTION

Thermoelectric Conversion Material

Figure 1:
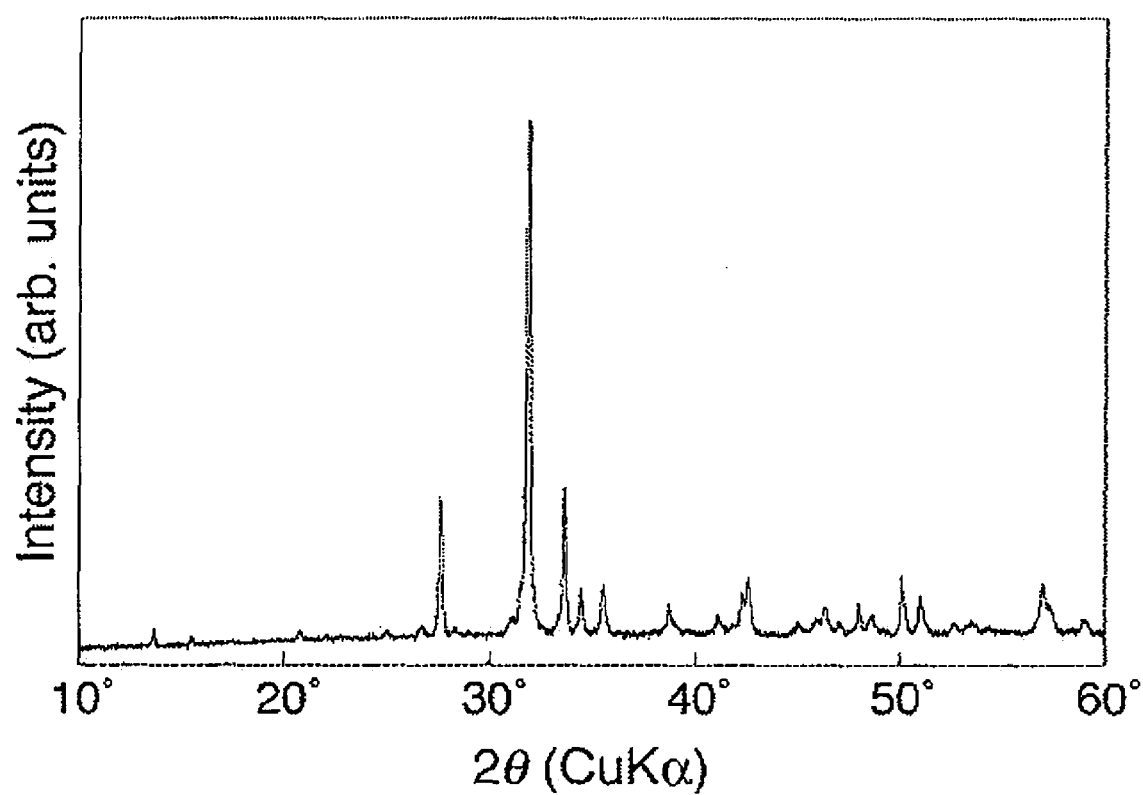
FIG. 1 shows an X-ray diffraction pattern of thermoelectric conversion material 1 of Example 1.

The thermoelectric conversion material according to the present invention includes a metal oxide containing $M^1$, $M^2$ and oxygen.

$M^1$ is an alkaline earth metal such as calcium (Ca), strontium (Sr) and barium (Ba); these may be used independently or in combination. $M^1$ may be a combination of an alkaline earth metal and lithium (Li), sodium (Na), potassium (K), magnesium (Mg), lanthanum (La), cerium (Ce), neodymium (Nd), samarium (Sm), bismuth (Bi) or lead (Pb).

$M^2$ is copper (Cu) or a combination of Cu and titanium (Ti), vanadium (V), chromium (Cr), manganese (Mn), iron (Fe), cobalt (Co) or nickel (Ni). The valence of Cu is preferably more than 2 and less than 3.

Furthermore, the mole ratio of $M^2$ to $M^1$ ($M^2/M^1$) is not less than 1.2, preferably not less than 1.6, and not more than 2.2, preferably not more than 1.8.

The metal oxide is preferably represented by the following formula (1) from the viewpoint of increasing the figure of merit (Z) of the thermoelectric conversion material:

$$M^1{}_{14}M^2{}_{24}O_{41-z} \quad (1)$$

wherein $M^1$ is an alkaline earth metal such as Ca, Sr and Ba; these may be used independently or in combination. Furthermore, $M^1$ may be a combination of an alkaline earth metal and other metal such as Li, Na, K, Mg, La, Ce, Nd, Sm, Bi or Pb; the other metal may also be used independently or in combination, $M^2$ is Cu or a combination of Cu and other metal such as Ti, V, Cr, Mn, Fe, Co or Ni, and z is not less than 0 and not more than 3.

The metal oxide is more preferably represented by the following formula (2):

$$(M^{11}{}_{1-x}M^{12}{}_{x})_{14}(Cu_{1-y}M^{22}{}_{y})_{24}O_{41-z} \quad (2)$$

wherein $M^{11}$ is a single element such as Ca, Sr and Ba; or a combination of these, such as a combination of Ca and Sr, a combination of Ca and Ba, a combination of Sr and Ba, and a combination of Ca, Sr and Ba, preferably, the single element Sr or Ca, or the combination of Sr and Ca, $M^{12}$ is a single element such as Li, Na, K, Mg, La, Ce, Nd, Sm, Bi or Pb, or a combination of these, preferably, the single element Bi or La, or the combination of Bi and La, $M^{22}$ is a single element such as Ti, V, Cr, Mn, Fe, Co or Ni, or a combination of these, preferably, the single element Mn or Co, or the combination of Mn and Co, x is not less than 0 and not more than 0.5, preferably not more than 0.3; y is not less than 0 and not more than 0.5, preferably not more than 0.3; and z is not less than 0 and not more than 3, preferably not more than 2.5.

From the viewpoint of further increasing the figure of merit (Z) of the thermoelectric conversion material, it is preferable that the metal oxide is a compound represented by the formula (2) and has a one-dimensional structure in which a sublattice represented by the formula $(M^{11}_{1-x}M^{12}_x)_2(Cu_{1-y}M^{22}_y)_2O_3$ and a sublattice having a one-dimensional chain represented by the formula $(Cu_{1-y}M^{22}_y)O_2$ are respectively piled up. The metal oxide is represented by, for example, the formula $Sr_{14}Cu_{24}O_{41}$ [$M^{11}$ is Sr, and x=y=z=0 in the formula (2)], and has a one-dimensional structure in which a sublattice represented by the formula $Sr_2Cu_2O_3$ and a sublattice having a one-dimensional chain represented by the formula $CuO_2$ are respectively piled up.

The thermoelectric conversion material is usually in the form of powder or sintered body, preferably sintered body. When the thermoelectric conversion material is in the form of sintered body, the thermoelectric conversion material may have appropriate shape and size as a thermoelectric conversion device. For example, the thermoelectric conversion material may be in the form of cylinder, disc, rectangular column, plate or thin film.

When the thermoelectric conversion material is in the form of sintered body, the thermoelectric conversion material has a density of usually not less than 70%, preferably not less than 90%, further preferably not less than 99%. The sintered density is a relative density, assuming that the specific gravity of the thermoelectric conversion material is 100%. The higher the sintered density of the thermoelectric conversion material, the higher the electric conductivity ($\sigma$), and the higher the mechanical strength thereof.

Furthermore, it is preferable that the crystal axes of the thermoelectric conversion material are oriented in the same direction from the viewpoint of improving the electric properties of the thermoelectric conversion device (for example, increasing the electric conductivity ($\sigma$) of the thermoelectric conversion material in the direction of current). The thermoelectric conversion material in which the crystal axes are oriented may be in the form of oriented sintered body or single crystal.

Method for Producing Thermoelectric Conversion Material

A thermoelectric conversion material may be produced by sintering a mixture of metal compounds which is converted into a thermoelectric conversion material by sintering. For example, the thermoelectric conversion material may be produced by a method wherein metals or metal compounds are weighed and mixed to obtain a mixture containing $M^1$ and $M^2$, and the mixture is sintered.

$M^1$ is an alkaline earth metal such as Ca, Sr and Ba; these may be used independently or in combination. $M^1$ may be a combination of an alkaline earth metal and Li, Na, K, Mg, La, Ce, Nd, Sm, Bi or Pb. $M^2$ is Cu or a combination of Cu and Ti, V, Cr, Mn, Fe, Co or Ni.

The mole ratio of $M^2$ to $M^1$ ($M^2/M^1$) is not less than 1.2, preferably not less than 1.6, and not more than 2.2, preferably not more than 1.8.

For example, when a thermoelectric conversion material including a metal oxide represented by the formula $Sr_7Ca_7Cu_{24}O_{41}$ is produced, a mixture may be prepared in which $M^1$ is a combination of Ca and Sr, $M^2$ is Cu, and the ratio of $M^2$ to $M^1$ ($M^2/M^1$) is 1.7 ($\cong$24/14).

Examples of the metals include Ca, Sr, Ba, Mg, Li, Na, K, La, Ce, Nd, Sm, Bi, Pb, Cu, Ti, V, Cr, Mn, Fe, Co and Ni.

Furthermore, the metal compounds are compounds containing the above metals. Examples of the metal compounds include compounds such as hydroxides, carbonates, nitrates, halides and organic acid salts (oxalates, etc.) which are decomposed and/or oxidized to oxides at high temperature, or the oxides.

Examples of the calcium compound include calcium oxide, calcium hydroxide, calcium carbonate, calcium nitrate and calcium chloride, preferably calcium carbonate.

Examples of the strontium compound include strontium oxide, strontium hydroxide, strontium carbonate, strontium nitrate and strontium chloride, preferably strontium carbonate.

Examples of the barium compound include barium oxide, barium hydroxide, barium carbonate, barium nitrate and barium chloride, preferably barium carbonate.

Examples of the copper compound include copper oxide, copper hydroxide, copper carbonate, copper nitrate and copper chloride, preferably copper oxide.

Examples of the other metal compound include also oxides, hydroxides, carbonates, nitrates, halides and organic acid salts.

Mixing may be carried out according to a method for preparing a uniform mixture satisfying the above mole ratio ($M^2/M^1$). The mixing may be carried out in either dry or wet process. The mixing may be carried out using ball mill, V-type mixer, vibrating mill, attritor, Dyno mill, dynamic mill, or the like. For example, when a thermoelectric conversion material containing a metal oxide represented by the formula $Sr_7Ca_7Cu_{24}O_{41}$ is produced, $CaCO_3$ powder, $SrCO_3$ powder, and CuO powder may be weighed so that the mole ratio of Ca:Sr:Cu is 7:7:24, and then mixed using the above apparatus. When a thermoelectric conversion material containing a metal oxide represented by the formula $Sr_7Ca_7Cu_{20}CO_4O_{41}$ is produced, $CaCO_3$ powder, $SrCO_3$ powder, CuO powder and $CO_3O_4$ powder may be weighed so that the mole ratio of Ca:Sr:Cu:Co is 7:7:20:4, and then mixed. When a thermoelectric conversion material containing a metal oxide represented by the formula $Sr_7Ca_7Cu_{20}Mn_4O_{41}$ is produced, $CaCO_3$ powder, $SrCO_3$ powder, CuO powder and $MnO_2$ powder may be weighed so that the mole ratio of Ca:Sr:Cu:Mn is 7:7:20:4, and then mixed.

The mixed powder has an average particle diameter of usually not less than about 10 nm and not more than about 100 μm.

When the mixture contains a compound which is decomposed and/or oxidized to oxide at high temperature, the mixture is preferably calcined. The calcination may be carried out at usually not less than 500° C., preferably not less than 600° C., and usually not more than 900° C., preferably not more than 800° C., for not less than 0.5 hours and not more than 24 hours. The calcination may be carried out under an oxidizing atmosphere containing air or oxygen. The hydroxide, carbonate, nitrate, halide, organic acid salt, etc. in the mixture may be converted into oxide by the calcination. Carbon dioxide gas and bound water may be removed from the mixture by the calcination. Furthermore, the calcination may be preferably carried out from the viewpoint of producing a sintered body with a uniform composition or a uniform structure or from the viewpoint of suppressing deformation at the step of sintering.

After the calcination, the mixture may be pulverized. The pulverized mixture may be subjected to mixing according to the above method. The pulverization may be carried out using ball mill, vibrating mill, attritor, Dyno mill, dynamic mill, or the like. The obtained mixed powder has an average particle diameter of usually not less than about 10 nm and not more than about 100 μm. The calcination, pulverization and mixing may be repeated twice or more.

Molding may be carried out prior to sintering. It is preferable that the mixture, the calcined mixture or the pulverized mixture is molded. It is further preferable that the calcined mixture is pulverized and then molded.

The molding may be carried out in either dry or wet process. The mixture is usually molded to be in the appropriate shape as a thermoelectric conversion device, which is, for example, plate, rectangular column or cylinder. The molding may be carried out using uniaxial press, cold isostatic press (CIP), mechanical press, hot press, hot isostatic press (HIP), doctor blade. The molding may be carried out using binder, dispersant, lubricant. In the press molding, molding pressure is usually not less than about 10 kg/cm$^2$ and not more than about 2000 kg/cm$^2$.

The sintering may be carried out at a temperature at which the mixture is sintered, and the temperature is higher than the calcination temperature when the calcination is carried out. The sintering temperature is not less than 600° C., preferably not less than 800° C., more preferably not less than 900° C., and not more than 1000° C., preferably not more than 960° C., more preferably not more than 950° C. The sintering time is usually not less than 0.5 hours and not more than 48 hours. The sintering atmosphere is usually an oxidizing atmosphere containing air or oxygen. For example, the oxygen gas concentration is not less than 5%, preferably not less than 10%. The sintering may be carried out simultaneously with the molding using HIP. For example, when the sintering is carried out under an atmosphere with high concentration of oxygen gas, a thermoelectric conversion material containing a metal oxide represented by $M^1_{14}M^2_{24}O_{41}$ [z=0 in the formula (1)] is obtained. On the other hand, when the sintering is carried out under an atmosphere with low concentration of oxygen gas, a thermoelectric conversion material containing a metal oxide represented by $M^1_{14}M^2_{24}O_{38}$ [z=3 in the formula (1)] is obtained.

The sintering may be repeated twice or more. The sintered body may be pulverized to obtain a pulverized product and then the product may be sintered again.

Thermoelectric conversion material may also be produced according to a method of co-precipitation, hydrothermal, dry-up, sputtering, chemical vapor deposition (CVD), sol-gel, floating zone melting (FZ) or templated single crystal growth.

Thermoelectric Conversion Device

The thermoelectric conversion device according to the present invention contains the above thermoelectric conversion material. Examples of the thermoelectric conversion device include a thermoelectric conversion device (see FIGS. 13 and 14 of JP 05-315657) containing a thermoelectric conversion material, another thermoelectric conversion material that is used with the thermoelectric conversion material as a pair, electrodes and a conductor, wherein one ends of the p-type thermoelectric conversion material and the n-type thermoelectric conversion material are connected to each other directly or via the conductor, and the electrodes are connected to the other ends, or a thermoelectric conversion device (see FIGS. 1 to 10 of JP 05-315657), wherein a p-type or an n-type thermoelectric conversion material is connected across both ends of a material serving as a good conductor of heat and as an electric insulator.

When the above thermoelectric conversion material is used as a p-type thermoelectric conversion material, an n-type thermoelectric conversion material is used for the other thermoelectric conversion material. Examples of the n-type thermoelectric conversion material include Al-doped ZnO, $CaMnO_3$, $SrTiO_{3-δ}$ and $LaNiO_{3-δ}$ (see JP 08-186293, JP 2003-142742, JP 08-231223 and JP 2003-282964). On the other hand, when the above thermoelectric conversion material is used as an n-type thermoelectric conversion material, a commercially available p-type thermoelectric conversion material may be used as the other thermoelectric conversion material.

The thermoelectric conversion device may be fabricated, for example, by connecting one ends of a p-type thermoelectric conversion material and an n-type thermoelectric conversion material to each other directly or via a conductor, and by connecting electrodes to the other ends.

EXAMPLES

The following examples will illustrate the present invention more in detail, but do not limit the scope of the invention. The thermoelectric properties and structures of thermoelectric conversion materials were evaluated as described below.

Electric conductivity: A sample was molded into a rectangular shape, platinum wires were attached thereto using silver paste, and the electric conductivity was measured using the DC four-terminal method. The measurement was carried out under air while the temperature was changed in the rang of from room temperature (about 300K) to 873K.

Seebeck coefficient: A type R thermocouple and platinum wires were attached using silver paste to both ends of a sample molded into a shape similar to that of the sample used when the electric conductivity was measured, and the temperature and the thermoelectromotive force of the sample were measured. The measurement was carried out in a tubular furnace while the temperature was changed in the range of from room temperature (about 300K) to 873K. A low-temperature portion was obtained by making one face of the sample into contact with a glass tube through which a cooling gas was passed, the temperatures at both ends of the sample were measured using the type R thermocouple, and the thermoelectromotive force ΔV generated between both end faces of the sample was measured at the same time. The temperature difference ΔT between both ends of the sample was controlled in the range of 1 to 10K by controlling the flow rate of the cooling gas. The inclinations of the straight lines in the graphs of ΔT and ΔV were obtained, and the Seebeck coefficient α was calculated.

Thermal conductivity: The specific heat and the thermal diffusivity of the sample were measured using the laser flash method at room temperature (about 300 k) under vacuum. The measurement was carried out using a standard laser flash thermal constants analyzer TC-7000 manufactured by ULVAC technologies Inc.

Structure: A sample was analyzed according to powder X-ray diffraction using an X-ray diffractometer (type: RINT2500TTR, manufactured by Rigaku Co., Ltd.) to obtain an X-ray diffraction pattern, and the structure was obtained by carrying out structural analysis using this pattern.

Composition: A mole ratio of $M^2$ to $M^1$ ($M^2/M^1$) was measured using an X-ray fluorescence spectrometer (PW1480 manufactured by Philips Corporation). The amount of metal ions in a solution in which the sample, accurately weighed, was dissolved in an acid was measured using chelate titration to obtain the mole ratio of oxygen.

Density: A density was obtained using the Archimedean method.

Example 1

Copper oxide (CuO, high purity reagent, manufactured by Kanto Chemical Co., Inc.), strontium carbonate ($SrCO_3$, SW-K, manufactured by Sakai Chemical Industry Co., Ltd.) and calcium carbonate ($CaCO_3$, 3N-A, manufactured by Ube Material Industries) were weighed and mixed for six hours using a ball mill (medium: plastic-coated iron ball having a diameter of 10 mm) to obtain a mixture of metal compounds having a Ca:Sr:Cu mole ratio of 7:7:24. The mixture was calcined at 700° C. for six hours under air. The calcined mixture was pulverized using a ball mill (medium: zirconia ball having a diameter of 5 mm). The pulverized mixture was molded using a uniaxial press (molding pressure: 200 kg/cm$^2$) and further molded using an isostatic press (molding pressure: 1500 kg/cm$^2$) to obtain a green body in the form of disc. The green body was sintered at 950° C. for 12 hours under air (oxygen gas concentration: 20%) to obtain a thermoelectric conversion material 1.

The thermoelectric conversion material 1 was black in color, and had a sintered density of not less than 99%. FIG. 1 showed an X-ray diffraction pattern of the thermoelectric conversion material 1. As shown in FIG. 1, the thermoelectric conversion material 1 had a single phase $Sr_7Ca_7Cu_{24}O_{41}$. The thermoelectric conversion material 1 had a one-dimensional structure in which a sublattice represented by the formula $(Sr, Ca)_2Cu_2O_3$ and a sublattice having a one-dimensional chain represented by the formula $CuO_2$ were respectively piled up.

As a result of composition analysis, the thermoelectric conversion material 1 had a Sr:Ca:Cu:O mole ratio of 7:7:24:41.

Figure 2:
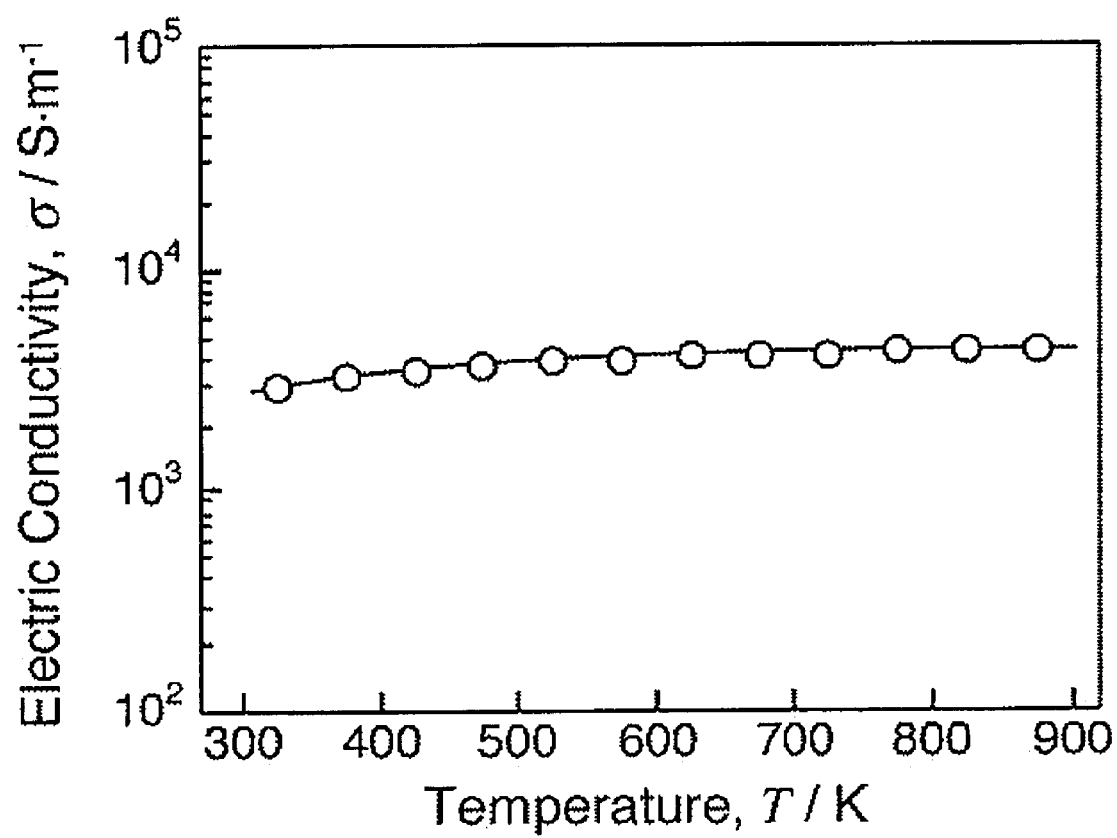
FIG. 2 shows the temperature dependence of the electric conductivity ($\sigma$) of the thermoelectric conversion material 1 of Example 1.
Figure 3:
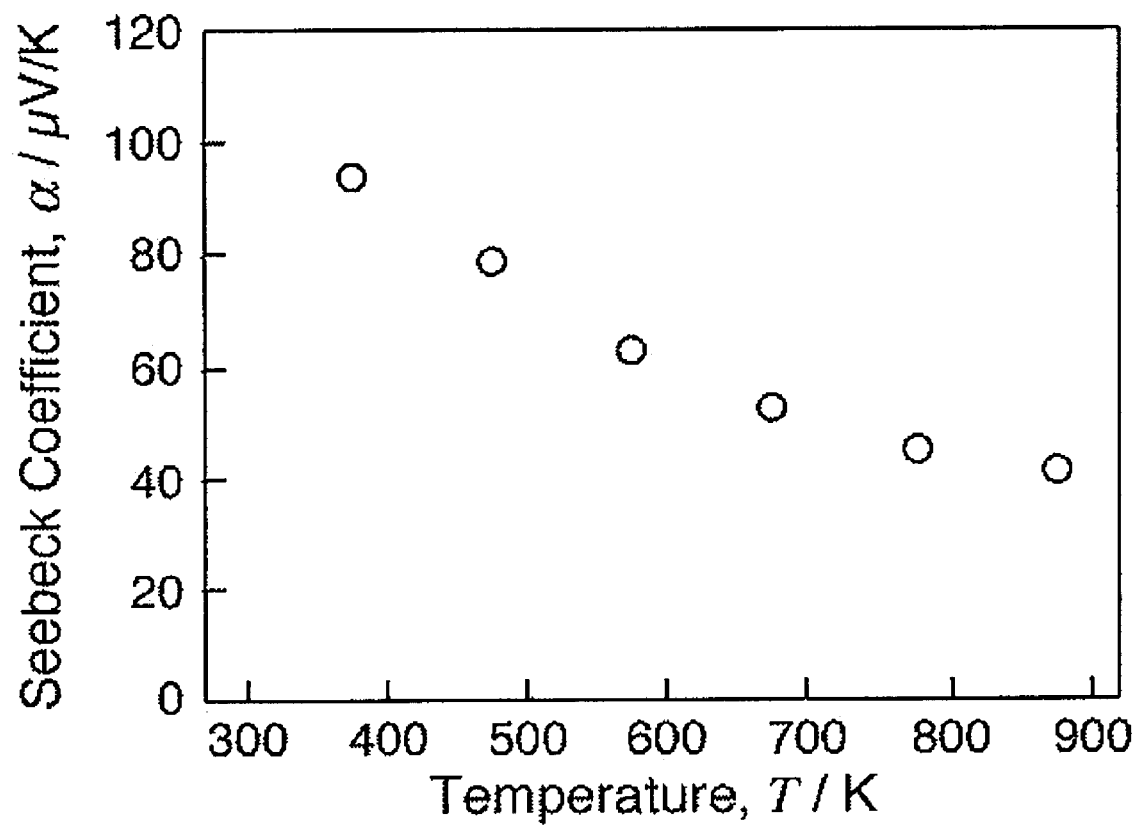
FIG. 3 shows the temperature dependence of the Seebeck coefficient ($\alpha$) of the thermoelectric conversion material 1 of Example 1.
Figure 4:
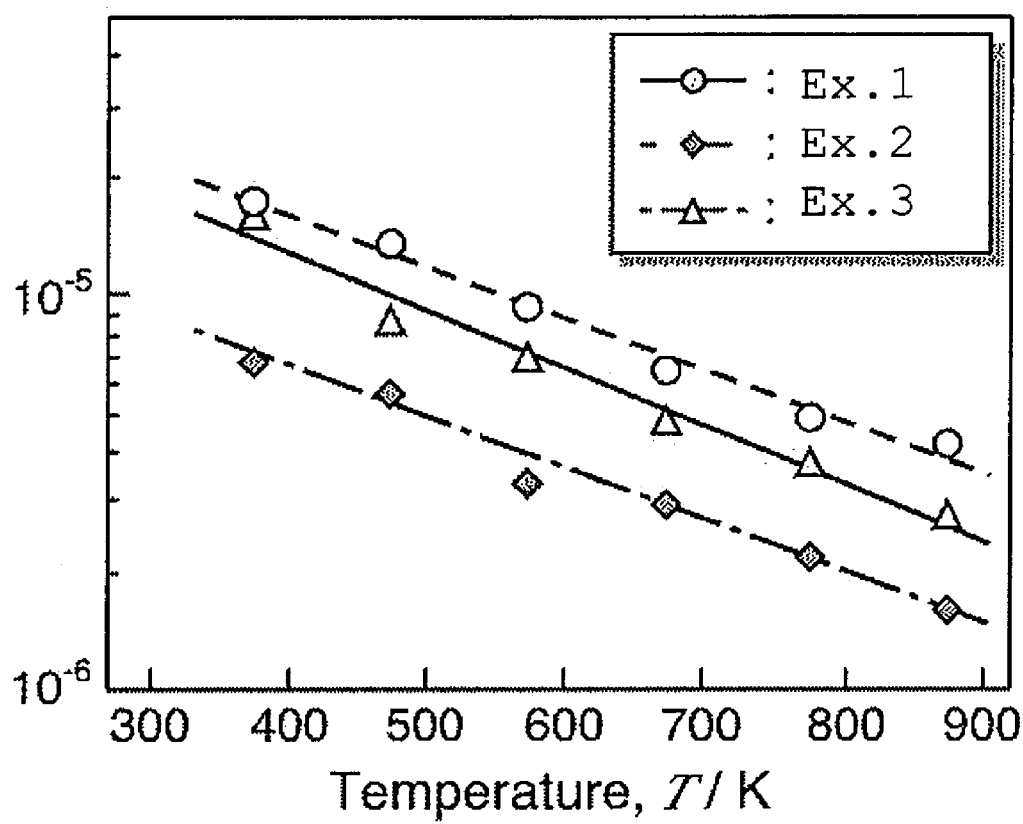
FIG. 4 shows the temperature dependence of the figures of merit (Z) of the thermoelectric conversion material 1 of Example 1, thermoelectric conversion material 2 of Example 2 and thermoelectric conversion material 3 of Example 3.

FIG. 2 showed the temperature dependence of the electric conductivity ($\sigma$) of the thermoelectric conversion material 1, and FIG. 3 showed the temperature dependence of the Seebeck coefficient ($\alpha$) of the thermoelectric conversion material 1. FIG. 4 showed the temperature dependence of the figure of merit (Z) of the thermoelectric conversion material 1.

Example 2

Thermoelectric conversion material 2 was obtained by carrying out the same operation as that described in Example 1 except that the Ca:Sr:Cu mole ratio was changed to 0:14:24 and that the sintering atmosphere was changed to 100% oxygen gas atmosphere (oxygen gas concentration: 100%). Table 1 showed the physical properties of the thermoelectric conversion material 2. FIG. 4 showed the temperature dependence of the figure of merit (Z) of the thermoelectric conversion material 2.

Example 3

Thermoelectric conversion material 3 was obtained by carrying out the same operation as that described in Example 1 except that the Ca:Sr:Cu mole ratio was changed to 4:10:24. Table 1 showed the physical properties of the thermoelectric conversion material 3. FIG. 4 showed the temperature dependence of the figure of merit (Z) of the thermoelectric conversion material 3.

Example 4

Thermoelectric conversion material 4 was obtained by carrying out the same operation as that described in Example 1 except that the Ca:Sr:Cu mole ratio was changed to 6:8:24. Table 1 showed the physical properties of the thermoelectric conversion material 4.

Example 5

Thermoelectric conversion material 5 was obtained by carrying out the same operation as that described in Example 1 except that the Ca:Sr:Cu mole ratio was changed to 8:6:24. Table 1 showed the physical properties of the thermoelectric conversion material 5.

TABLE 1

Physical properties of thermoelectric conversion materials

| Example | Sample name | Composition | $\alpha$ ($\mu$V/K) 373K | $\alpha$ ($\mu$V/K) 873K | $\sigma$ ($\times 10^3$ S/m) 373K | $\sigma$ ($\times 10^3$ S/m) 873K | $\kappa$ (W/mK) 300K | Z ($\times 10^{-5}$K$^{-1}$) 373K | Z ($\times 10^{-5}$K$^{-1}$) 873K |
|---|---|---|---|---|---|---|---|---|---|
| Example 1 | Thermoelectric conversion material 1 | $Ca_7Sr_7Cu_{24}O_{41}$ | 95 | 41 | 3.36 | 4.42 | 1.8 | 1.74 | 0.43 |
| Example 2 | Thermoelectric conversion material 2 | $Sr_{14}Cu_{24}O_{41}$ | 195 | 58 | 0.42 | 1.29 | 2.3 | 0.67 | 0.16 |
| Example 3 | Thermoelectric conversion material 3 | $Ca_4Sr_{10}Cu_{24}O_{41}$ | 125 | 42 | 2.40 | 3.68 | 2.4 | 1.59 | 0.28 |
| Example 4 | Thermoelectric conversion material 4 | $Ca_6Sr_8Cu_{24}O_{41}$ | 101 | 50 | 3.43 | 4.65 | 2.2 | 1.60 | 0.35 |
| Example 5 | Thermoelectric conversion material 5 | $Ca_8Sr_6Cu_{24}O_{41}$ | 104 | 31 | 1.71 | 2.53 | 1.9 | 1.19 | 0.14 |

According to Examples, the thermoelectric conversion materials had positive Seebeck coefficients ($\alpha$), and a decreased as Ca increased. The thermoelectric conversion materials having a Ca composition of 6 to 7 showed the maximum electric conductivity ($\sigma$). The thermoelectric conversion materials had sufficiently low thermal conductivity ($\kappa$), and $\kappa$ decreased as Ca increased.

Furthermore, the figures of merit (Z) of the thermoelectric conversion materials were in the range of about 10$^{-6}$ to $10^{-5} K^{-1}$, and the values were higher than the conventional compounds represented by $ACuO_{2+\delta}$.

INDUSTRIAL APPLICABILITY

The thermoelectric conversion material according to the present invention has a high figure of merit Z and is used for thermoelectric conversion devices being excellent in energy conversion efficiency.

The invention claimed is:

1. A thermoelectric conversion material containing a metal oxide represented by the formula (2):

$$(M^{11})_{14}(Cu_{1-y}M^{22}_y)_{24}O_{41-z} \quad (2)$$

wherein $M^{11}$ is a combination of Sr and Ca, a Ca:Sr molar ratio is from 4:10 to 8:6, $M^{22}$ is at least one selected from the group consisting of Ti, V, Cr, Mn, Fe, Co and Ni, $0 \leq y \leq 0.5$, and $0 \leq z \leq 3$.

2. The thermoelectric conversion material according to claim 1, wherein the valence of Cu is more than 2 and less than 3.

3. A thermoelectric conversion device containing the thermoelectric conversion material according to claim 1 or 2.

4. A method for producing the thermoelectric conversion material comprising the step of sintering a mixture of metal compounds containing $M^1$ and $M^2$ at from 600 to 1000° C., wherein $M^1$ is a combination of Sr and Ca and a Ca:Sr molar ratio is from 4:10 to 8:6, $M^2$ comprises Cu and may contain one selected from the group consisting of Ti, V, Cr, Mn, Fe, Co and Ni, and the mole ratio of $M^2$ to $M^1$ ($M^2/M^1$) is 24/14.

* * * * *